United States Patent [19]
Good et al.

[11] Patent Number: 5,475,971
[45] Date of Patent: Dec. 19, 1995

[54] RIDING MOWER

[75] Inventors: Ronald D. Good, Cushing; James W. Rockhold, Newall; Keith E. Storm; James G. Godfrey, both of Cushing, all of Okla.

[73] Assignee: T & M Technologies, Inc., Cushing, Okla.

[21] Appl. No.: 309,218

[22] Filed: Sep. 20, 1994

[51] Int. Cl.[6] .................................................. A01D 34/00
[52] U.S. Cl. ............................................. 56/14.9; 56/15.2
[58] Field of Search .................................. 56/14.7, 14.9, 56/15.1, 15.2, 15.3, 15.9

[56] References Cited

U.S. PATENT DOCUMENTS

| | | | |
|---|---|---|---|
| 4,707,971 | 11/1987 | Forpahl et al. | 56/15.2 X |
| 4,869,056 | 9/1989 | Lynch | 56/15.2 |
| 4,912,916 | 4/1990 | Parsons, Jr. | 56/15.2 |
| 4,956,965 | 9/1990 | Parsons, Jr. | 56/15.1 |

*Primary Examiner*—Michael Powell Buiz
*Attorney, Agent, or Firm*—Dunlap & Codding

[57] ABSTRACT

A riding rotary mower is provided having a first chassis, a first chassis wheel assembly, a second chassis, a second chassis wheel assembly and a deck defining a blade housing containing a plurality of cutting blades. The second chassis is movably connected to the first chassis such that, upon actuation of a hydraulic assembly, the second chassis and the deck are movable relative to the first chassis between an operating position wherein the second chassis, the deck and the cutting blade are positioned for cutting grass, and an inspection position wherein the second chassis, the deck and the cutting blade extend in an upwardly direction at an angle to the first chassis. The connection of the second chassis to the first chassis also permits restricted horizontal and lateral movement of the second chassis and the mowing deck so that the second chassis and the mowing deck can automatically adjust to the contour of a supporting surface, such as the ground, when the second chassis is disposed in the operating position and the riding rotary mower travels along the supporting surface.

19 Claims, 5 Drawing Sheets

RIDING MOWER

BACKGROUND OF THE INVENTION

1. Field of the Invention

The present invention relates to a riding rotary mower and more particularly, but not by way of limitation, to a riding rotary mower having a forwardly extending deck containing at least one cutting blade wherein the deck is selectively movable between an operating position and an angularly disposed inspection position.

2. Brief Description of Prior Art

Riding rotary mowers have heretofore been known which have a deck containing one, or more cutting blades and the deck is connected to the chassis of the mower so that the deck is adjustable to various cutting heights. In one such prior art riding rotary mower the deck is connected to an extension frame which extends outwardly from the chassis of the mower; and in another prior art riding rotary mower the deck is attached to the chassis so as to be disposed below the chassis.

Problems exist with such prior art riding rotary mowers in that many of such mowers lack the required maneuverability to cut grass and vegetation around trees, fences and other objects. In addition, many of the prior art riding rotary mowers require that the deck be disconnected from the chassis in order to clean the deck and to service or replace the cutting blades of the mower. Many of the prior art riding rotary mowers also require drive belts to operate the cutting blades and such drive belts are subject to breaking or stretching, which requires time consuming maintenance to replace such drive belts.

To prolong the life of the cutting blades and to prevent rust and corrosion of the deck due to moisture and fertilizer, as well as debris build-up around the cutting blades, one should periodically clean the deck, especially the portion of the deck defining a housing fork the cutting blades. Thus, it would be highly desirable to construct a riding rotary mower which eliminates the use of drive belts and wherein the deck could be disposed in a position which enhances inspection, maintenance and replacement of parts, without the necessity of disconnecting the deck from the chassis of the riding rotary mower, while at the same time providing a riding rotary mower having a desired degree of maneuverability in order to enhance the efficient use of the mower. It is to such an improved riding rotary mower that the present invention is directed.

BRIEF DESCRIPTION OF THE DRAWINGS

FIG. 6 is a schematic diagram of a hydraulic drive assembly and a control assembly for the riding rotary mower of the present invention.

DETAILED DESCRIPTION

Figure 1:
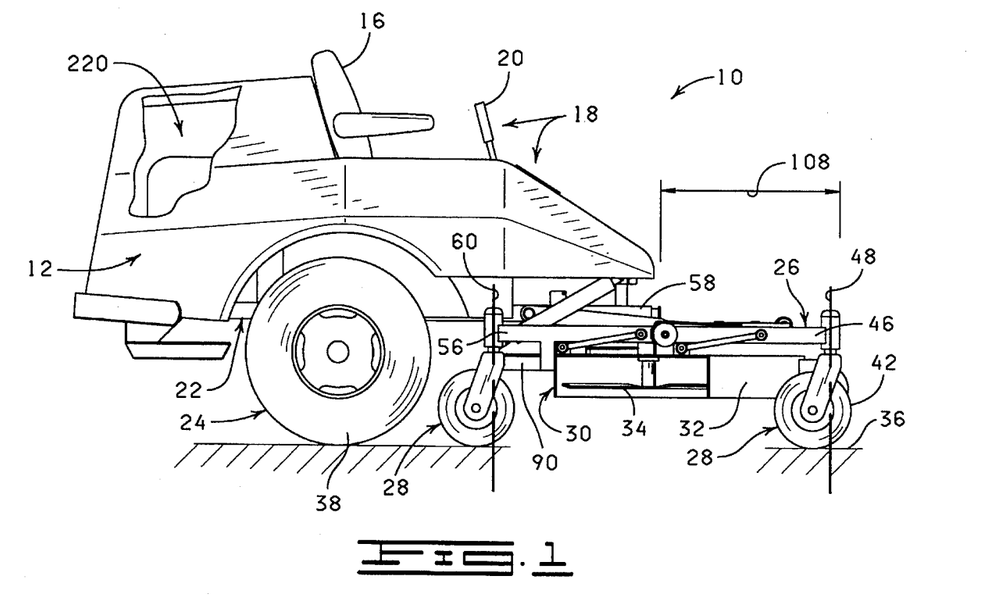
FIG. 1 is a side elevational view of a riding rotary, mower constructed in accordance with the present invention wherein a deck of the riding rotary mower is disposed in an operating position.
Figure 2:
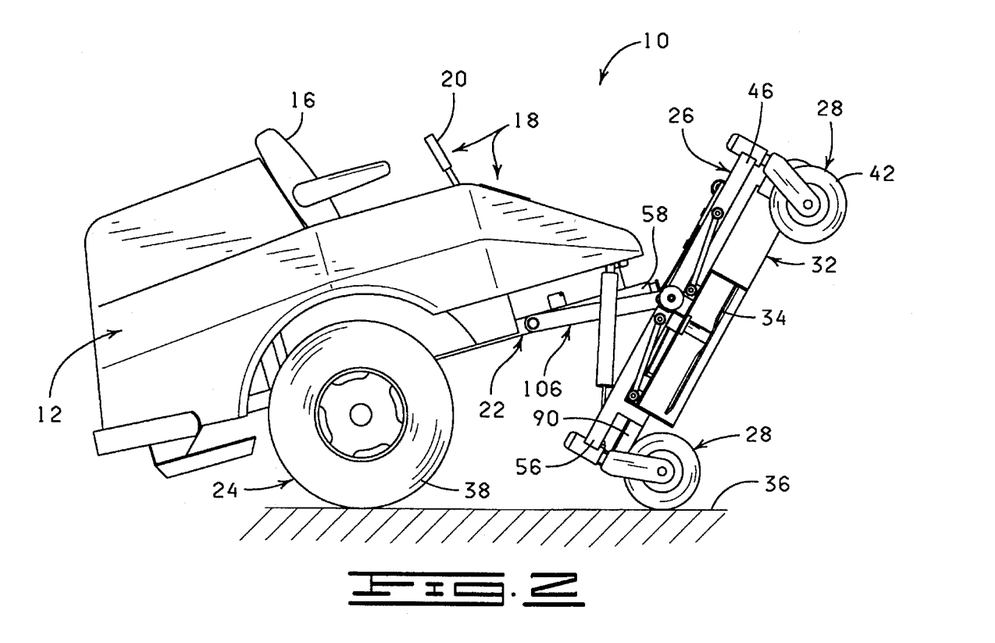
FIG. 2 is a side elevational view of the riding rotary mower of the present invention wherein the deck of the riding rotary mower is disposed in an inspection position.
Figure 3:
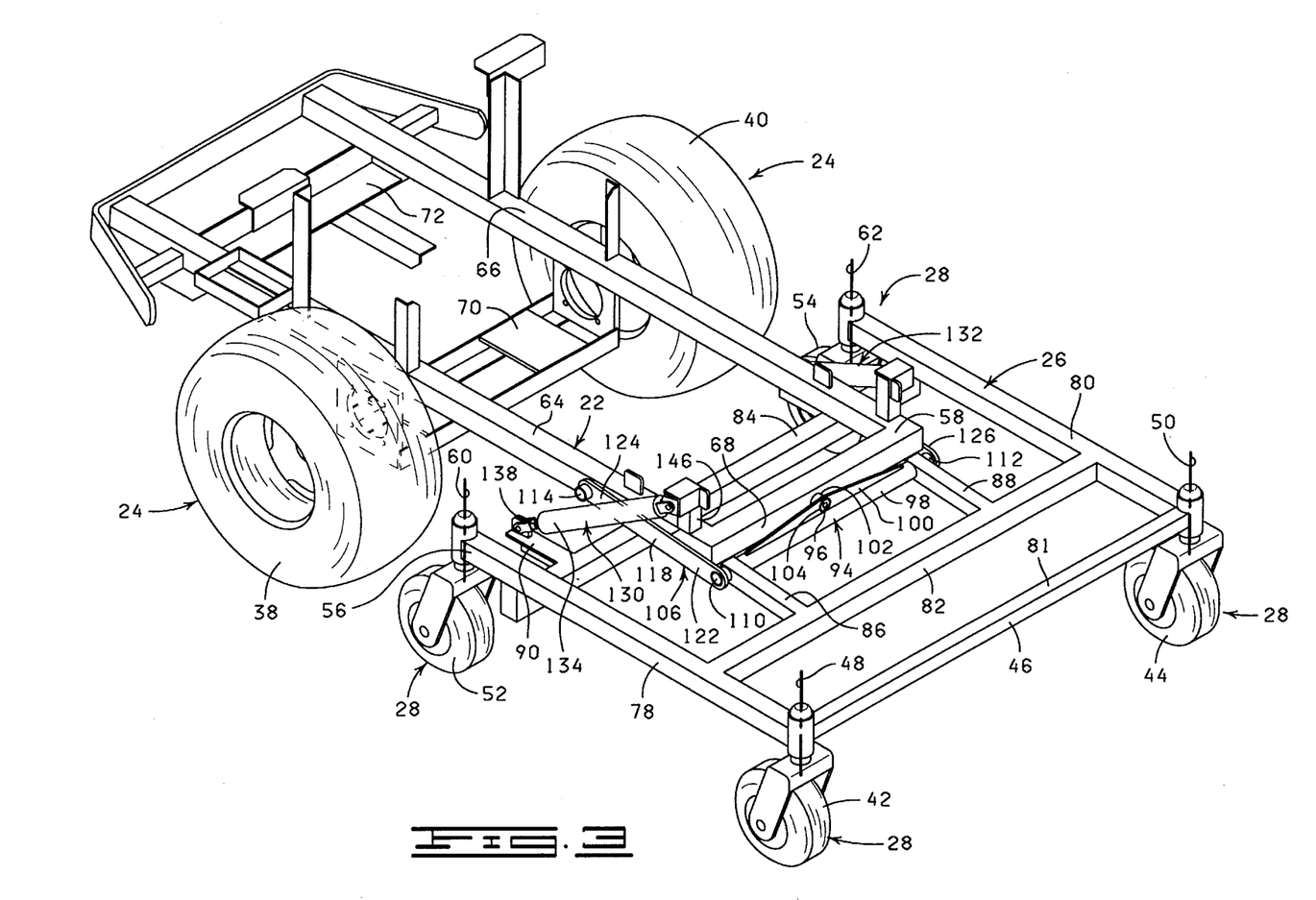
FIG. 3 is a perspective view of a first and second chassis of the riding rotary mower of the present invention wherein the second chassis which supports the deck of the riding rotary mower is disposed in the operating position as shown in FIG. 1.

Referring now to the drawings, and particularly to FIGS. 1, 2 and 3, a riding rotary mower 10 constructed in accordance with the present invention is illustrated. The riding rotary mower 10 includes a body 12 for housing a hydraulic assembly 14 (FIG. 6), an operator's seat 16 and a control assembly 18 which includes a joy-stick 20. The riding rotary mower 10 further includes a first chassis 22, a first chassis wheel assembly 24 operably connected to the hydraulic drive assembly 14, a second chassis 26, a plurality of second chassis wheel assemblies 28 and a deck 30 defining a blade housing 32 containing a plurality of cutting blades, such as cutting blade 34. The second chassis 26 is movably connected to the first chassis 22 such that the second chassis 26, and thus the deck 30 connected thereto, are movable relative to the first chassis 22 between an operating position wherein the second chassis 26, the deck 30 and the cutting blade 34 are positioned for cutting grass (FIG. 1) and an inspection position wherein the second chassis 26, the deck 30 and the cutting blade 34 extend in an upwardly direction at an angle to the first chassis 22 (substantially as shown in FIG. 2). As will be described in more detail hereinafter, the connection of the second chassis 26 to the first chassis 22, in combination with the hydraulic assembly 14, also permits restricted horizontal, lateral movement of the second chassis 26 and the mowing deck 30 so that the second chassis 26 and the mowing deck 30 can automatically adjust to the contour of a supporting surface 36, such as the ground, when the second chassis 26 is disposed in the operating position and the riding rotary mower 10 travels along the supporting surface 36.

The first chassis wheel assembly 24 includes two wheels 38 and 40 journally connected to the first chassis 22 so as to support the first chassis 22 on the supporting surface 32. The wheels 38 and 40 are operably connected to the hydraulic assembly 14 so that upon actuation of the hydraulic assembly 14 by the control assembly 18 selective rotational movement can be imparted to the wheels 38 and 40 to drivingly move the riding rotary mower 10 over the supporting surface 36.

The second chassis wheel assembly 28 includes two spatially disposed forward support wheels 42 and 44 connected to a front end 46 of the second chassis 26 so as to support the front end 46 of the second chassis 26 on the supporting surface 36 when the second chassis 26 is disposed in the operating position. The forward support wheels 42 and 44 are connected to the front end 46 of the second chassis 26 in a conventional manner so that the forward support wheels 42 and 44 roll over the supporting surface 36 when the riding rotary mower 10 is travelling along the supporting surface 36, while at the same time permitting the forward support wheels 42 and 44 to rotate about vertical axes 48 and 50 so that the second chassis 26 moves along a pathway dictated by control of the wheels 38 and 40 of the first chassis wheel assembly 24.

Figure 4:
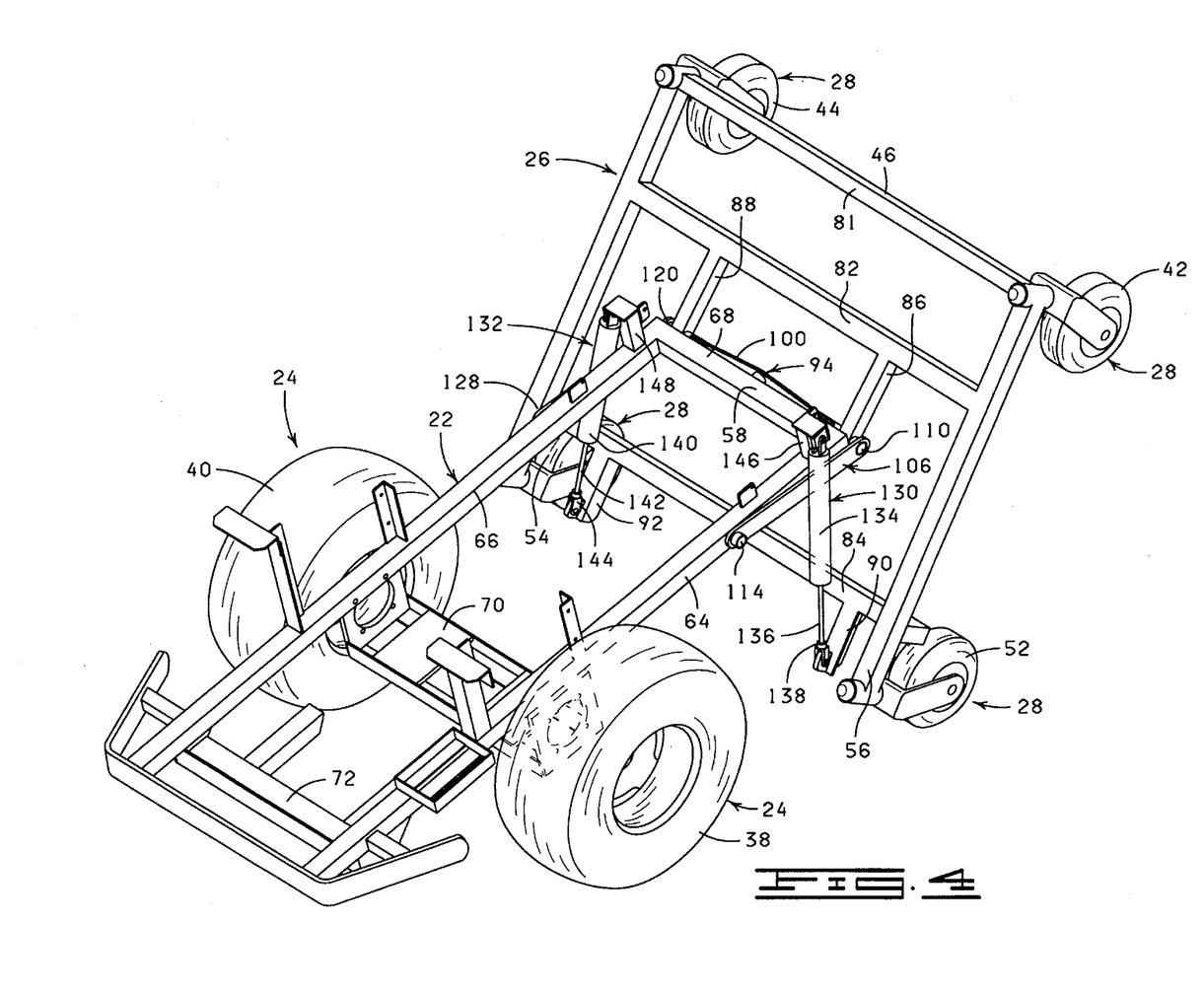
FIG. 4 is a perspective view of the first and second chassis of the riding rotary mower of FIG. 3 wherein the second chassis which supports the deck of the riding rotary mower is disposed in the inspection position as shown in FIG. 2.

The second chassis wheel assembly 28 further includes two spatially disposed rearward support wheels 52 and 54 (FIG. 5) connected to a rear end 56 of the second chassis 26 so as to support the rear end 56 of the second chassis 26 on the supporting surface 36 when the second chassis 26 is in the operating position (FIG. 3) and so as to support a front end 58 of the first chassis 22 on the supporting surface 36 when the second chassis 26 is disposed in either the operating position (FIG. 3) or the inspection position (FIG. 4).

The rearward support wheels 52 and 54 are connected to the rear end 56 of the second chassis 26 in a conventional manner so that the rearward support wheels 52 and 54 roll over the supporting surface 36 and track the forward support wheels 42 and 44 when the riding rotary mower 10 is travelling along the supporting surface 36 while at the same time permitting the rearward support wheels 52 and 54 to rotate about vertical axes 60 and 62. Thus, when the second chassis 26 is disposed in the operating position, the forward support wheels 42 and 44, in combination with the rearward support wheels 52 and 54, support the front end 58 of the first chassis 22 and the second chassis 26 substantially as shown in FIG. 1; whereas, when the second chassis 26 is disposed in the inspection position, the rearward support wheels 52 and 54 support the front end 58 of the first chassis 22 and the second chassis 26 substantially as shown in FIG. 2.

The deck 30 is connected to the second chassis 26 so that the deck 30 can be selectively moved in unison with the second chassis 26 between the operating position and the inspection position and so that the deck 30 can be vertically moved relative to the second chassis 26 when same are disposed in the operating position to selectively adjust the cutting height of the cutting blades 34. The hydraulic assembly 14 operably connects the cutting blade 34 of the riding mower 10 to the control assembly 18 in a manner which will be described in more detail hereinafter so that an operator of the riding rotary mower 10 can selectively actuate the cutting blade 34 and adjust the cutting height of the cutting blade 34.

Referring now to FIGS. 3 and 4, the first chassis 22 is further characterized as having a first side 64 and a substantially parallel, spatially disposed second side 66. A plurality of support members, such as support members 68, 70 and 72 extend between the first and second sides 64 and 66 of the first chassis 22 for supporting components of the riding rotary mower 10, such as the body 12, the hydraulic assembly 14, including hydraulic motors 74 and 76 (FIG. 6) employed to drive the wheels 38 and 40 of the first chassis wheel assembly 24.

The second chassis 26 is also further characterized as having a first side 78, a substantially parallel, spatially disposed second side 80 and a plurality of cross brace members extending between the first and second sides 78 and 80 of the second chassis 26, such as cross brace members 81, 82 and 84. A first pair of spatially disposed connecting arms 86 and 88 extend from the cross brace member 82 in a rearwardly direction and a second pair of spatially disposed connecting arms 90 and 92 extend from the cross brace member 84 in a rearwardly direction substantially as shown.

To connect the second chassis 26 to the front end 58 of the first chassis 22 so as to permit horizontal, lateral movement of the second chassis 26, the deck 30 and the cutting blade 34 relative to the first chassis 22 when the second chassis 26 is in the operating position and the riding rotary mower 10 is travelling along the supporting surface 36, the riding rotary mower 10 further includes a first connector assembly 94. The first connector assembly 94 includes a shaft 96 and a connector member 98 connectable to the shaft 96. The shaft 96 is connected to the front end 58 of the first chassis 22 so as to extend along a central longitudinal axis of the first chassis 22 in a forward direction. The connector member 98, which extends between the connecting arms 86 and 88, is provided with an upwardly extending portion 100 having a centrally disposed shaft receiving aperture 102. In order to connect the second chassis 26 to the first chassis 22 so as to permit the before mentioned horizontal, lateral movement of the second chassis 26, the deck 30 and the cutting blade 34 relative to the first chassis 22, the shaft 96 is disposed through the shaft receiving aperture 102 of the connector member 98 and the connector member 98 is secured on the shaft 96 in a conventional manner so as to provide the desired rotational movement of the connector member 98 on the shaft 96. To enhance lateral rotation of the connector member 98, and thus the second chassis 26 on the shaft 96, as well as to stabilize the connector member 98 on the shaft 96, a bushing 104 adapted to receive the shaft 96 is disposed within the shaft receiving aperture 102 of the connector member 98 in a conventional manner.

The riding rotary mower 10 further includes a second connecting assembly 106 for connecting the second chassis 26 to the first chassis 22 so that the second chassis 26, the deck 30 and the cutting blade 34 can be selectively moved between the operational position (FIG. 1) wherein the rear end 56 of the second chassis 26 is spatially disposed below and parallel the front end 58 of the first chassis 22 and the front end 46 of the second chassis 26 extends a distance 108 forward the front end 58 of the first chassis 22 and the inspection position (FIG. 2) wherein the second chassis 26 and deck 30 extend in an upwardly direction at an angle to the first chassis 22 so that the blade housing 32 and the cutting blades 34 are viewable and readily accessible. The connection of the second chassis 26 to the front end 58 of the first chassis 22 via the first connector assembly 94, in combination with the connection of the second chassis 26 to the first chassis 22 via the second connector assembly 106 and the hydraulic assembly 14, provide a floating action of the second chassis 26, the deck 30 and the cutting blade 34 so as to substantially maintain the second chassis 26, the deck 30 and the cutting blade 34 in a selected position relative to the supporting surface 36 when same are disposed in the operating position and the riding rotary mower is moved along the supporting surface 36.

The second connector assembly 106 includes a pair of first linkage connectors 10 and 112, a pair of second linkage connectors (only one of the second linkage connectors being shown and designated by the numeral 114) which are substantially identical in construction and function as the first linkage connectors 110 and 112 and a pair of chassis linkage members 118 and 120. The first linkage connector 110 is connected to the connecting arm 86 of the second chassis 26 so as to extend outwardly therefrom; and the first linkage connector 114 is connected to the connecting arm 88 of the second chassis 26 so as to extend outwardly therefrom and be axially aligned with the first linkage connector 110. The second linkage connector 114 is connected to the first side 64 of the first chassis 22 so as to extend outwardly therefrom and be substantially aligned with the first linkage connector 110. A second linkage connector (not shown) is connected to the second side 66 of the first chassis 22 so as to extend outwardly therefrom and be substantially aligned with the first linkage connector 112. The chassis linkage member 118 is an elongated member having a first end 122 and a second end 124; and the chassis linkage member 120 is also an elongated member having a first end 126 and a second end 128. The first end 122 of the chassis linkage member 118 is pivotally connected to the first linkage connector 110 extending from the connecting arm 86 of the second chassis 26 and the second end 124 of the chassis linkage member 118 is pivotally connected to the second linkage connector 114 extending from the first side 64 of the first chassis 22. The first end 126 of the chassis linkage member 120 is pivotally connected to the first linkage connector 112 extending from the connecting arm 88 of the second chassis 26 and the second end (not shown) of the chassis linkage member 120 is pivotally connected to the second linkage connector (also not shown) extending from the second side 66 of the first chassis 22.

To effect movement of the second chassis 26 between the operating position and the inspection position, a pair of first hydraulic cylinders 130 and 132 of the hydraulic assembly 14 are pivotally connected to the first chassis 22 and the second chassis 26. The first hydraulic cylinders 130 and 132 are of conventional construction. Thus, the first hydraulic cylinder 130 is provided with a cylinder 134 and a reciprocating rod 136 having a distal end 138 extending outwardly from the cylinder 134; and the first hydraulic cylinder 132 is provided with a cylinder 140 and a reciprocating rod 42 having a distal end 144 extending outwardly from the cylinder 140.

The distal end 138 of the reciprocating rod. 136 of the first hydraulic cylinder 130 is pivotally connected to the connecting arm 90 of the second chassis 26 and the cylinder 134 of the first hydraulic cylinder 130 is pivotally connected to an upwardly extending leg member 146 connected to the first side 64 of the first chassis 22 near the front end 58 thereof. The distal end 144 of the reciprocating rod 142 of the first hydraulic cylinder 132 is pivotally connected to the connecting arm 92 of the second chassis 26 and the cylinder 140 of the first hydraulic cylinder 132 is pivotally connected to an upwardly extending leg member 148 connected to the second side 66 of the chassis 22 near the front end 58 thereof.

Figure 5:
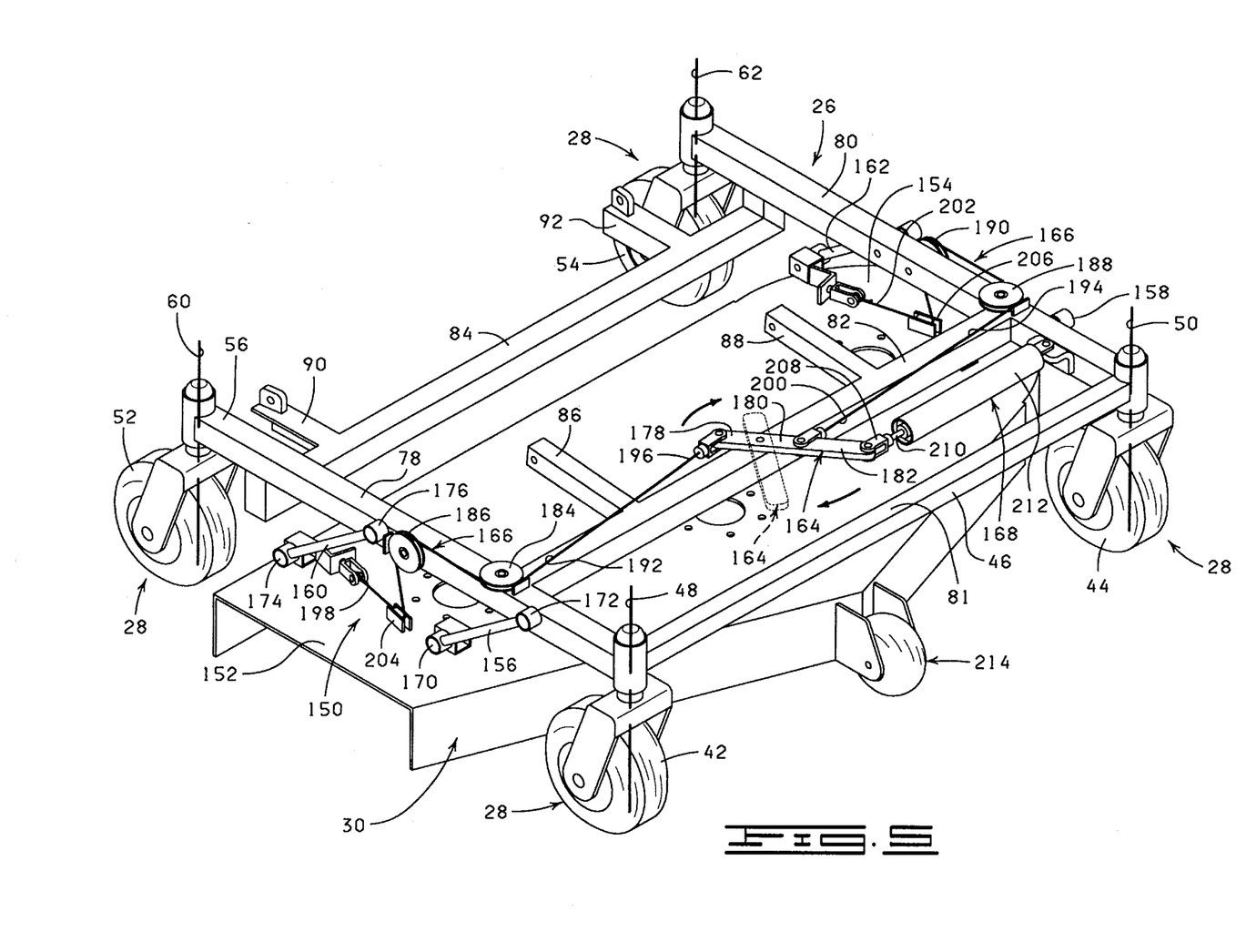
FIG. 5 is a perspective view of the second chassis of the riding lawn mower of the present invention illustrating the deck connected thereto.

Referring now to FIGS. 5, the riding rotary mower 10 of the present invention further includes a deck connecting assembly 150 for connecting a first and second side 152 and 154 of the deck 30 to the first and second sides 78 and 80 of the second chassis 26 so that the deck 30, and thus the cutting blade 34 can be vertically adjusted relative to the second chassis 26 and the supporting surface 36 to vary the cutting height of the cutting blade 34.

The deck connecting assembly 150 includes a pair of first stabilizer members 156, 158, a pair of second stabilizer members 160, 162, a lever 164 connected to the cross brace member 82 of the second chassis 26 so as to be movable between a first position and a second position and a cable assembly 166 for connecting the lever 164 to the deck 30. A second hydraulic cylinder 168 of the hydraulic assembly 14 is disposed between and connected to the second side 80 of the second chassis 26 and the lever 164 for selectively moving the lever 164 between the first position and the second position to vertically adjust the disposition of the deck 30 relative to the supporting surface 36 via the cable assembly 166 and thereby maintain the cutting blade 34 at a selected height relative to the supporting surface 36.

The first stabilizer member 156 and the second stabilizer member 160 cooperate to pivotally connect the first side 152 of the deck 30 to the first side 78 of the second chassis 26; and the first stabilizer member 158 and the second stabilizer member 162 cooperate to pivotally connect the second side 152 of the deck 30 to the second side 80 of the second chassis 26.

The first stabilizer members 156 and 158, and the second stabilizer members 160 and 162 are substantially identical in construction and function. Thus, only the first stabilizer member 156 and the second stabilizer member 160, and their pivotal connection to the deck 30 and the first side 78 of the second chassis 26 will be described in detail herein after.

The first stabilizer member 156 has a first end 170 and a second end 172. The first end 170 of the first stabilizer member 156 is pivotally connected to the deck 30 near the first side 152 thereof in a conventional manner and the second end 172 of the first stabilizer member 156 is pivotally connected to the first side 78 of the second chassis 26 in a conventional manner so that the first stabilizer member 156 extends between the deck 30 and the first side 78 of the second chassis 26 substantially as shown.

The second stabilizer member 160 has a first end 174 and a second end 176. The first end 174 of the second stabilizer member 160 is pivotally connected to the deck 30 near the first side 152 thereof in a conventional manner and the second end 176 of the second stabilizer member 160 is pivotally connected to the first side 78 of the second chassis 26 in a conventional manner so that the second stabilizer 160 is spatially disposed in a rearward direction from the first stabilizer member 156 and the second stabilizer member 160 extends between the deck 30 and the first side 78 of the second chassis 26 substantially as shown.

The lever 164 of the deck connecting assembly 150 is an elongated member having a first end 178, a medial portion 180 and a second end 182. The lever 164 is pivotally connected to cross brace member 82 of the second chassis 26 near the first end 178 of the lever 164 so that the lever 164 is substantially intermediately disposed between the first and second side 78 and 80 of the second chassis 26 and is selectively movable between the first position shown by solid lines in FIG. 5 and the second position shown by phantom lines in FIG. 5.

The cable assembly 166, which connects the lever 164 to the deck 30 so that the vertical disposition of the deck 30 is varied in response to movement of the lever 164 between the first and second positions, includes a first substantially horizontally disposed pulley 184, a first substantially vertically disposed pulley 186, a second substantially horizontally disposed pulley 188, a second substantially vertically disposed pulley 190, a first cable 192 and a second cable 194. The first substantially horizontally disposed pulley 184 is journally connected to the first side 78 of the second chassis 26 at the junction of the cross brace member 82 and the first side 78 of the second chassis 26; and the first substantially vertically disposed pulley 186 is journally connected to the first side 78 of the second chassis 26 so as to be disposed between the pivotal attachment of the second ends 172 and 176 of the first and second stabilizer members 156 and 160 to the first side 78 of the second chassis 26 such that the first substantially vertically disposed pulley 186 is operably aligned with the first substantially horizontally disposed pulley 184.

The second substantially horizontally disposed pulley 188 is journally connected to the second side 80 of the second chassis 26 at the junction of the cross brace member 82 and the second side 80 of the second chassis 26; and the second substantially vertically disposed pulley 190 is journally connected to the second side 80 of the second chassis 26 so as to be disposed between the pivotal attachment of the first and second stabilizer members 158 and 162 to the second side 80 of the second chassis 26 such that the second substantially vertically disposed pulley 190 is operably aligned with the second substantially horizontally disposed pulley 188.

The first cable 192 has a first end 196 and a second end 198. The first end 196 of the first cable 192 is pivotally connected to the first end 178 of the lever 164 and the second end 198 of the first cable 192 is pivotally connected to the deck 30 in a conventional manner so that the first cable 192 operably engages the first substantially horizontally disposed pulley 184 and the first substantially vertically disposed pulley 186 substantially as shown.

The second cable 194 also has a first end 200 and a second end 202. The first end 200 of the second cable 194 is pivotally connected to the medial portion 180 of the lever 164 so as to be disposed between the pivotal attachment of the lever 164 to the cross brace member 82 of the second chassis and the second end 182 of the lever 164. The second end of the second cable 194 is pivotally connected to the deck in a conventional manner so that the second cable 194 engages the second substantially horizontally disposed pulley and the second substantially vertically disposed pulley substantially as shown.

To stabilize the first cable 192 as the lever 164 is moved between the first and second positions to vertically adjust the disposition of the deck 30 relative to the supporting surface 36 and thereby maintain the cutting blade at a selected height relative to the supporting surface 36, the cable assembly 166 further includes a first cable guide adapted to slidingly receive the first cable 192 and a second cable guide 206 adapted to slidingly receive the second cable 194. The first cable guide 204 is connected to the deck in a conventional manner so that the first cable guide 204 is disposed substantially below the first substantially vertically disposed pulley 186 substantially as shown; and the second cable guide 206 is connected to the deck 30 in a conventional manner so that the second cable guide 206 is disposed below the second substantially vertically disposed pulley 190.

To effect movement of the lever 164 between the first position and the second position so that the vertical disposition of the deck 30 can be varied in response to movement of the lever 164, a distal end 208 of a reciprocating rod 210 of the second hydraulic cylinder 168 of the hydraulic system 14 is pivotally connected to the second end 182 of the lever 164 and a cylinder 212 of the second hydraulic cylinder 168 is pivotally connected to the second side 82 of the second chassis 26 at a position forward of the cross brace member 82 of the second chassis 26.

To prevent the deck 30 from contacting the supporting surface 36 when the riding rotary mower 10 is traveling along the supporting surface 36 and encounters a change in slope of the supporting surface 36, the deck 30 is provided with an anti-scalp wheel 214 connected to the deck 30 in a conventional manner substantially as shown.

Referring now to FIG. 6, the hydraulic assembly 14 is shown in combination with the control assembly 18. The hydraulic assembly 14 and the control assembly 18 enable the operator of the riding rotary mower 10 to selectively drive the rotary riding mower 10 over the supporting surface 36, to move the second chassis 26, the deck 30 and thus the cutting blade 34 between the operating position (FIG. 1) and the inspection position (FIG. 2), to activate the cutting blade 34 and to adjust the height of the deck 30 and the cutting blade 34 relative to the supporting surface 36.

The hydraulic assembly 14 includes, in addition to the hydraulic motors 74, 76, the first hydraulic cylinders 130, 132 and the second hydraulic cylinder 168, an engine 220, a tandem pump 222, a fluid reservoir 224, an auxiliary pump 225, a filter 226, a charge pump 228, manifolds 230 and 232, a hydraulic blade motor 234. The engine 220 can be either a gasoline powered engine or a diesel engine and the engine 220 is operably connected to the tandem pump 222 in a conventional manner. The auxiliary pump 225 is connected to the fluid reservoir 224 so that fluidic communication is established between the fluid reservoir 224, the auxiliary pump 225, the manifold 232. The first hydraulic cylinders 130, 132 and the second hydraulic cylinder 168 are in fluidic communication with the manifold 232. The manifold 230 is connected to the charge pump 228 so that fluidic communication is established therebetween. A battery 233 is operably connected to the control assembly 18 and the engine 220 in a conventional manner so as to provide activation energy to the control assembly 18 and the engine 220.

Referring now to FIG. 6, in combination with FIGS. 3 and 4, the movement of the second chassis 26, the deck 30 and thus the cutting blade 34 between the operating position and the inspection position by actuation of the hydraulic assembly 14 employing the control assembly 18 will now be discussed. The cylinder 134 of the first hydraulic cylinder 130 is provided with a fluid inlet port 242 and a fluid outlet port 244; and the cylinder 140 of the first hydraulic cylinder 132 is also provided with a fluid inlet port 248 and a fluid outlet port 250. To selectively move the second chassis 26 from the operating position (FIG. 3) to the inspection position (FIG. 4) the operator of the riding rotary mower 10 actuates auxiliary pump 225 via the control assembly 18 and opens solenoid actuated hydraulic valve 254 so that hydraulic fluid flows from the fluid reservoir 224 to the first hydraulic cylinders 130 and 132 via the auxiliary pump 225, the manifold 232 and fluid inlet ports 242 and 248 of the first hydraulic cylinders 130 and 132. When hydraulic fluid is supplied to the first hydraulic cylinders 130 and 132 their respective reciprocating rod 136 and 142 extend which results in movement of the second chassis 26 from the operating position (FIG. 3) to the inspection position (FIG. 4). On the other hand, when the solenoid actuated hydraulic valve 254 of the control assembly 18 is closed, the flow of hydraulic fluid to the first hydraulic cylinders 130 and 132 is interrupted and hydraulic fluid is withdrawn from the first hydraulic cylinders 130 and 132 via their respective fluid outlet ports 244 and 250 and returned to the fluid reservoir 224 via manifold 232 and filter 226. Closing of the solenoid actuated hydraulic valve 254 causes the reciprocating rods 136 and 142 of the first hydraulic cylinders 130 and 132 to retract which results in the movement of the second chassis 26 from the inspection position to the operating position.

When the reciprocating rods 136 and 142 of the first hydraulic cylinder 130 and 132 are in the retracted position (i.e. the second chassis 26 is disposed in the operating position) the fluid reservoir 224 of the hydraulic drive system 14 is in fluidic communication with the first hydraulic cylinders 130 and 132 via the outlet ports 244 and 250 of the first hydraulic cylinders 130 and 132 so that pressure is taken off the first hydraulic cylinders 130 and 132 by the manifold 232. The interconnection of the first chassis 22 to the second chassis 26 via the first connector assembly 94, in combination with the lack of pressure on the first hydraulic cylinders 130 and 132 enables the second chassis 26, and thus the deck 30 connected thereto, to "float" to compensate for the contour of the supporting surface 32.

Referring now to FIG. 6, in combination with, FIG. 5, the adjustment of the height of the deck 30 and the cutting blade 34 relative to the supporting surface 36 by actuation of the hydraulic assembly 14 with the control assembly 18 will be discussed. The cylinder 212 of the second hydraulic cylinder 168 is provided with a fluid inlet port 256 and a fluid outlet port 258. The fluid inlet port 256 of the cylinder 212 of the second hydraulic cylinder 168 is in fluidic communication with the auxiliary pump 225 via the manifold 232; and the fluid outlet port 258 of the cylinder 212 of the second hydraulic cylinder 168 is in fluidic communication with the fluid reservoir 224 via the manifold 232 and the filter 226.

To actuate the second hydraulic cylinder 168 so that the lever 164 of the deck connecting assembly 150 can be selectively moved between the first position and the second position and thus vary the vertical disposition of the deck 30 relative to the second chassis 26 and the supporting surface 36, solenoid actuated hydraulic valve 260 of the control assembly 18 is opened which permits the hydraulic fluid to flow to the second hydraulic cylinder 168. Flow of hydraulic fluid to the second hydraulic cylinder 168 via fluid inlet port 256 causes the reciprocating rod 210 of the hydraulic cylinder 212 to extend which results in the movement of the lever 164 from the first position to the second position and thus vertical movement of the deck 30 and the cutting blade 34 in an upwardly direction to thereby adjust the height of the deck 30 and the cutting blade 34 relative to the supporting surface 36.

When the operator desires to lower the deck 30 and the cutting blade 34 relative to the supporting surface 36, the operator closes the solenoid actuated hydraulic valve 260 of the control assembly 18 to interrupt flow of hydraulic fluid to the second hydraulic cylinder 168. When the flow of hydraulic fluid to the second hydraulic cylinder 168 is interrupted, hydraulic fluid in the cylinder 212 of the second hydraulic cylinder 168 is passed to the fluid reservoir 224 via the fluid outlet port 258 of the cylinder 212, the manifold 232 and the filter 226, and the reciprocating rod 210 of the second hydraulic cylinder 168 is retracted into the cylinder 212 which results in the movement of the lever 164 to the first position and thus the lowering of the deck 30 relative to the second chassis 26 and the supporting surface 36.

The hydraulic blade motor 234 is operably connected to the cutting blade 34 of the riding rotary mower 10 so as to impart selective rotational movement to the cutting blade 34. While the riding rotary mower 10 has been described as having one cutting blade 34 for ease of illustration, it should be understood that the riding rotary mower 10 will generally have two, and more desirably three cutting blades and, in such instance, the number of hydraulic blade motors employed will correspond to the number of cutting blades.

The hydraulic blade motor 234, which is connected to and supported by the deck 30 in a conventional manner, is provided with a fluid inlet port 262, a first fluid outlet port 264 and a second fluid outlet port 266. The fluid inlet port 262 of the hydraulic blade motor 234 is in fluidic communication with the manifold 230 which is in fluidic communication with the charge pump 228. The first fluid outlet port 264 of the hydraulic blade motor 234 is in fluidic communication with the manifold 230; and the second fluid outlet port 266 of the hydraulic blade motor 234 is in fluidic communication with the fluid reservoir 224. To actuate the hydraulic blade motor 234, the operator of the riding rotary mower 10 closes solenoid actuated hydraulic valve 268 of the control assembly 18 which enable hydraulic fluid to enter the fluid inlet port 262 of the hydraulic blade motor 234 and thereby impart a rotational cutting motion to the cutting blade 34. To deactivate the hydraulic blade motor 234, the operator of the riding rotary mower 10 closes the solenoid actuated hydraulic valve 268 of the control assembly 18 so that flow of hydraulic fluid to the hydraulic blade motor is interrupted.

The hydraulic wheel motors 74 and 76 are operably connected to the wheels 38 and 40 of the first wheel assembly 24 and to the joy-stick 20 (FIG. 1) of the control assembly 18 in a conventional manner so that upon activation of the hydraulic wheel motors 74 and 76 selective rotation can be imparted to the wheels 38 and 40 of the riding rotary mower 10 thereby permitting the operator of the riding rotary mower 10 to directionally drive the riding rotary mower 10 over the supporting surface 36 at varying speeds. The hydraulic wheel motor 74 is a reversible motor and is provided with a fluid inlet port 270 and a fluid outlet port 272; and the hydraulic wheel motor 76 is also a reversible motor and is provided with a fluid inlet port 274 and a fluid outlet port 276. The fluid inlet and fluid outlet ports 270 and 272 of the hydraulic wheel motor 74 are in fluidic communication with the tandem pump 222 and the fluid inlet and fluid outlet ports 274 and 276 of the hydraulic wheel motor 76 are in fluidic communication with the tandem pump 222. It should be noted that the tandem pump 222 is capable of reversing the flow of hydraulic fluid to the hydraulic wheel motors 74 and 76 and thereby reverse the rotation of the wheels 38 and 40 of the second chassis wheel assembly 24. A swash plate 278, which is operably connected to the joy stick 20, is disposed within the tandem pump 222 and actuates the hydraulic wheel motor 74 for forward or reverse motion and swash plate 280, which is also operably connected to the joy stick 20, is disposed within the tandem pump 222 and actuates the hydraulic wheel motor 76 for forward or reverse motion. Thus, the flow of hydraulic fluid to the hydraulic wheel motors 74 and 76 is controlled by the swash plates 278 and 280 of the control assembly 18.

The unique interconnection of the first chassis 22 to the second chassis 26, in combination with the hydraulic assembly 14 of the riding rotary mower 10, enables the operator of the riding rotary mower 10 to selectively drive the rotary riding mower 10 over the supporting surface 36, to move the second chassis 26, the deck 30 and thus the cutting blade 32 between the operating position (FIG. 1) and the inspection position (FIG. 2), to activate the cutting blade 32 and to adjust the height of the deck 30 and he cutting blade 34 relative to the supporting surface 36 with the control assembly 18.

Changes may be made in the construction and the operation of the various components, elements and assemblies described herein and changes may be made in the steps or the sequence of steps of the methods described herein without departing from the spirit and scope of the invention as defined in the following claims.

What is claimed:

1. A riding rotary mower having at least one cutting blade, comprising:

a first chassis having a front end and a rear end;

first chassis wheel means for supporting the rear end of the first chassis on a support surface;

a second chassis disposed near the front end of the first chassis, the second chassis having a front end and a rear end, the rear end of the second chassis spatially disposed below and substantially parallel the front end of the first chassis so that the front end of the second chassis extends a distance forward the front end of the first chassis and the second chassis is disposed substantially parallel to the first chassis when the second chassis is in an operating position;

a deck connected to the second chassis, the deck defining a blade housing containing the cutting blade;

second chassis wheel means for supporting the second chassis on the support surface;

means for movably connecting the second chassis to the front end of the first chassis whereby the second chassis is movable relative to the first chassis and whereby the deck and the cutting blade are movable between the operating position wherein the second chassis, the deck and the cutting blade are positioned for cutting grass and an inspection position wherein the second chassis, the deck and the cutting blade extend in an upwardly direction at an angle to the first chassis so that the cutting blade and the blade housing defined by the deck are viewable, the second chassis wheel mean cooperating with the first chassis wheel means of the first chassis to support the rotary riding mower implement in a stable position when the second chassis, the deck and cutting blade are in one of the operating position and the inspection position, and hydraulic means operably connected to the first chassis wheel means, the cutting blade and the second chassis for selectively actuating the first chassis wheel means and the cutting blade and for moving the second chassis between the operating position and the inspection position, wherein the means for movably connecting the second chassis to the front end of the first chassis comprises:

a first connector assembly for pivotally connecting the second chassis to the first chassis so as to permit horizontal, lateral movement of the second chassis, the deck and the cutting blade relative to the first chassis when the second chassis is in the operating position; and a second connector assembly for pivotally connecting the second chassis to the first chassis so as permit longitudinal movement of the second chassis, the deck and the cutting blade relative to the first chassis and to permit the second chassis, the deck and the cutting blade to be moved between the operating position and the inspection position, the first and second connector assemblies cooperating with hydraulic means so as to provide a floating action of the second chassis, the deck and the cutting blade and substantially maintain the second chassis, the deck and the cutting blade in a selected position relative to the supporting surface when same are disposed in the operating position and the rotary mower is moved along the supporting surface.

2. The riding rotary mower of claim 1 wherein the hydraulic means for selectively moving the second chassis, the deck and the cutting blade between one of the operating position and the inspection position comprises:

at least one first hydraulic cylinder having a cylinder and a reciprocating rod with a distal end of the rod extending outwardly from the cylinder, the distal end of the reciprocating rod pivotally connected to the rear end of the second chassis and the cylinder pivotally connected near the forward end of the first chassis such that upon actuation of the first hydraulic cylinder the second chassis, the deck and the cutting blade are selectively moved and maintained in one of the operating position and the inspection position.

3. The riding rotary mower of claim 2 wherein the first connector assembly for pivotally connecting the second chassis to the first chassis comprises:

a shaft connected to the front end of the first chassis such that the shaft extends from the forward end of the first chassis substantially along a central longitudinal axis of the first chassis;

a support member secured to the second chassis so as to be disposed substantially intermediate the forward and rearward ends of the second chassis, the support member extending in an upwardly direction from the second chassis and having a substantially centrally disposed aperture therein adapted to receive the shaft extending from the forward end of the first chassis; and means for pivotally connecting the support member on the second chassis to the shaft extending from the forward end of the first chassis.

4. The riding rotary mower of claim 3 wherein the first connector assembly for pivotally connecting the Second chassis to the first chassis further comprises:

bushing means positionable on the shaft and disposable within the aperture of the support member for stabilizing the connection of the second chassis to the first chassis.

5. The riding rotary mower of claim 4 wherein the first chassis is further characterized as having a first side and a second side, and wherein the second connector assembly for pivotally connecting the second chassis to the first chassis comprises:

a pair of first linkage connectors, one of the first linkage connectors connected to the first side of the first chassis so as to extend outwardly therefrom and be substantially normally disposed to the first side of the first chassis, the other of the first linkage connectors connected to the second side of the first chassis so as to extend outwardly therefrom and be substantially normally disposed to the second side of the first chassis;

a pair of second linkage connectors, one of the second linkage connectors connected to the second chassis so as to be substantially aligned with the first linkage connector extending from the first side of the first chassis, the other of the second linkage connectors connected to the second chassis so as to be substantially aligned with the first linkage connector extending from the second side of the first chassis; and a pair of chassis linkage members, each of the chassis linkage members having a first end and a second end, the first end of one of the chassis linkage members pivotally connected to the first linkage connector extending from the first side of the first chassis and the second end of the chassis linkage member pivotally connected to the aligned second linkage connector supported by the second chassis, the first end of the other of the chassis linkage members pivotally connected to the chassis linkage member extending from the second side of the first chassis and the second end of the chassis linkage member pivotally connected to the aligned second linkage connector such that, in an assembled position, the second chassis, the deck and the cutting blade are selectively moveable between the operating position and the inspection position in response to actuation of the first hydraulic cylinder.

6. The riding rotary mower of claim 1 wherein the first connector assembly for pivotally connecting the second chassis to the first chassis comprises:

a shaft connected to the front end of the first chassis such that the shaft extends from the forward end of the first chassis substantially along a central longitudinal axis of the first chassis;

a support member secured to the second chassis so as to be disposed substantially intermediate the forward and rear ends of the second chassis, the support member extending in an upwardly direction from the second chassis and having a substantially centrally disposed aperture therein adapted to received the shaft extending from the forward end of the first chassis; and means for pivotally connecting the support member on the second chassis to the shaft extending from the forward end of the first chassis.

7. The riding rotary mower of claim 6 wherein the hydraulic means comprises a pair of first hydraulic cylinders and wherein the first connector assembly for pivotally connecting the second chassis to the first chassis further comprises:

bushing means positionable on the shaft and disposable within the aperture of the support member for stabilizing the connection of the second chassis to the first chassis.

8. The riding rotary mower of claim 6 wherein the first chassis is further characterized as having a first side and a second side, and wherein the second connector assembly for pivotally connecting the second chassis to the first chassis comprises:

a pair of first linkage connectors, one of the first linkage connectors connected to the first side of the first chassis so as to extend outwardly therefrom and be substantially normally disposed to the first side of the first chassis, the other of the first linkage connectors connected to the second side of the first chassis so as to extend outwardly therefrom and be substantially normally disposed to the second side of the first chassis;

a pair of second linkage connectors, one of the second linkage connectors connected to the second chassis so as to be substantially aligned with the first linkage connector extending from the first side of the first chassis, the other of the second linkage connectors connected to the second chassis so as to be substantially aligned with the first linkage connector extending from the second side of the first chassis; and a pair of chassis linkage members, each of the chassis linkage members having a first end and a second end, the first end of one of the chassis linkage members pivotally connected to the first linkage connector extending from the first side of the first chassis and the second end of the chassis linkage member pivotally connected to the aligned second linkage connector supported by the second chassis, the first end of the other of the chassis linkage member pivotally connected to the chassis linkage member extending from the second side of the first chassis and the second end of the chassis linkage member pivotally connected to the aligned second linkage connector such that, in an assembled position, the second chassis, the deck and the cutting blade are selectively moveable between the operating position and the inspection position in response to actuation of the first hydraulic cylinder.

9. The riding rotary mower of claim 8 wherein the deck is characterized as having a first side and a second side, and wherein the rotary mower further comprises:

deck connecting means for connecting the deck to the second chassis so that the deck and cutting blade are vertically adjustable to vary the cutting height of the cutting blade relative to the supporting surface, the deck connecting means comprising:

a plurality o first stabilizer members, each of the first stabilizer members having a first end and a second end, the first end of each of the first stabilizer members pivotally connected to the deck and the second end of each of the first stabilizer members pivotally connected to the second chassis such that the first stabilizer members are spatially disposed along the deck near the first side thereof;

a plurality of second stabilizer members, each of the second stabilizer members having a first end and a second end, the first end of each of the second stabilizer members pivotally connected to the deck and the second end of each of the second stabilizer members pivotally connected to the second chassis such that the second stabilizer members are spatially disposed along the deck near the second side thereof;

a lever having a first end, a medial portion and a second end, the lever pivotally connected near the first near thereof to the second chassis near the forward end thereof so as to be movable between a first position and a second position;

cable means for connecting one of the first and second ends of the lever and the medial portion of the lever to the deck; and wherein the hydraulic means further comprises a second hydraulic cylinder pivotally connected to the lever and to the second chassis for selectively moving the lever between the first position and the second position to vertically adjust the disposition of the deck relative to the supporting surface and thereby maintain the cutting blade at a selected height relative to the supporting surface.

10. The riding rotary mower of claim 9 wherein the second chassis is characterized as having a first side, a second side and a cross brace member extending therebetween such that the cross brace member is disposed near the forward end of the second chassis frame, the lever being pivotally connected to the cross brace member at a position substantially intermediate the first and second sides of the second chassis and the second hydraulic cylinder of the hydraulic means being pivotally connected to the second end of the lever and to the second chassis, and wherein the cable means comprises:

a first substantially horizontally disposed pulley journally connected to the first side of the second chassis at the junction of the cross brace member and the first side of the second chassis;

a second substantially horizontally disposed pulley journally connected to the second side of the second chassis at the junction of the cross brace member and the Second side of the second chassis;

a first substantially vertically disposed pulley journally connected to the first side of the second chassis at a position between the pivotal connection of the first and second stabilizer members to the first side of the second chassis such that the first substantially vertically disposed pulley is operably aligned with the first substantially horizontally disposed pulley;

a second substantially vertically disposed pulley journally connected to the second side of the second chassis at a position between the pivotal connection of the first and second stabilizer members to the second side of the second chassis such that the second substantially vertically disposed pulley is operably aligned with the second substantially horizontally disposed pulley;

a first cable having a first end and a second end, the first end of the first cable pivotally connected to the first end of the lever and the second end of the first cable pivotally connected to the deck such that the first cable engages the first substantially horizontally disposed pulley and the first substantially vertically disposed pulley; and a second cable having a first end and a second end, the first end of the second cable pivotally connected to the medial portion of the lever so as to be disposed between the pivotal attachment of the lever and the second end of the lever, the second end of the second cable pivotally connected to the deck such that the second cable engages the second substantially horizontally disposed pulley and the second substantially vertically disposed pulley.

11. The riding rotary mower of claim 10 wherein the cable means further comprises:

a first cable guide connected to the deck such that the first cable guide is disposed substantially below the first vertical pulley; and a second cable guide connected to the deck such that the second cable guide is disposed substantially below the second vertical pulley.

12. The riding rotary mower of claim 1 wherein the deck is characterized as having a first side and a second side, and wherein the riding rotary mower further comprises:

deck connecting means for connecting the deck to the second chassis; the deck connecting means and the hydraulic means operably connected so that the deck and cutting blade are vertically adjustable to vary the cutting height of the cutting blade relative to the supporting surface, the deck connecting means comprising:

a plurality of first stabilizer members, each of the first stabilizer members having a first and a second end, the first end of each of the first stabilizer members pivotally connected to the deck and the second end of each of the first stabilizer members pivotally connected to the second chassis such that the first stabilizer members are spatially disposed along the deck near the first side thereof;

a plurality of second stabilizer members, each of the second stabilizer members having a first end and a second end, the first end of each of the second stabilizer members pivotally connected to the deck and the second end of each of the second stabilizer members pivotally connected to the second chassis such that the second stabilizer members are spatially disposed along the deck near the second side thereof;

a lever having a first end, a medial portion and a second end, the lever pivotally connected near the first end thereof to the second chassis near the forward end thereof so as to be movable between a first position and a second position;

cable means for connecting one of the first and second ends of the lever and the medial portion of the lever to the deck; and wherein the hydraulic means is pivotally connected to the lever and to the second chassis for selectively moving the lever between the first position and the second position to vertically adjust the disposition of the deck relative to the supporting surface and thereby maintain the cutting blade at a selected height relative to the supporting surface.

13. The riding rotary mower of claim 12 wherein the second chassis is characterized as having a first side, a second side and a cross brace member extending therebetween such that the cross brace member is disposed near the forward end of the second chassis, the lever being pivotally connected to the cross brace member at a position substantially intermediate the first and second sides of the second chassis and the means for selectively moving the lever between the first position and the second position being pivotally connected to the second end of the lever, and wherein the cable means comprises:

a first substantially horizontally disposed pulley journally connected to the first side of the second chassis at the junction of the cross brace member and the first side of the second chassis;

a second substantially horizontally disposed pulley journally connected to the second side of the second chassis at the junction of the cross brace member and the second side of the second chassis;

a first substantially vertically disposed pulley journally connected to the first side of the second chassis at a position between the pivotal connection of the first and second stabilizer members to the first side of the second chassis such that the first substantially vertically disposed pulley is operably aligned with the first substantially horizontally disposed pulley;

a second substantially vertically disposed pulley journally connected to the second side of the second chassis at a position between the pivotal connection of the first and second stabilizer members to the second side of the second chassis such that the second substantially vertically disposed pulley is operably aligned with the second substantially horizontally disposed pulley;

a first cable having a first end and a second end, the first end of the first cable pivotally connected to the first end of the lever and the second end of the first cable pivotally connected to the deck such that the first cable engages the first substantially horizontally disposed pulley and the first substantially vertically disposed pulley; and a second cable having a first end and a second end, the first end of the second cable pivotally connected to the medial portion of the lever so as to be disposed between the pivotal attachment of the lever and the second end of the lever, the second end of the second cable pivotally connected to the deck such that the second cable engages the second substantially horizontally disposed pulley and the second substantially vertically disposed pulley.

14. The riding rotary mower of claim 13 wherein the cable means further comprises:

a first cable guide connected to the deck such that the first cable guide is disposed substantially below the first vertical pulley; and a second cable guide connected to the deck such that the second cable guide is disposed substantially below the second vertical pulley.

15. A riding mower having at least one cutting blade, comprising:

a first chassis having a front end and a rear end;

first chassis wheel means for supporting the rear end of the first chassis on a support surface;

a second chassis disposed near the front end of the first chassis;

second chassis wheel means for supporting the front end of the first chassis and the second chassis on the support surface;

a deck connected to the second chassis, the deck having a first side, a second side and defining a housing containing the cutting blade;

means for movably connecting the second chassis to the front end of the first chassis whereby the second chassis is movable relative to the first chassis and whereby the deck and the cutting blade are movable between an operating position wherein the second chassis, the deck and the cutting blade are positioned for cutting vegetation and an inspection position wherein the second chassis, the deck and the cutting blade extend in an upwardly direction at an angle to the first chassis so that the cutting blade and an underside of the deck are viewable, the second chassis wheel means cooperating with the first chassis wheel means of the first chassis to support the lawn care implement in a stable position when the second chassis, the deck and cutting blade are in one of the operating position and the inspection position; and deck connecting means for connecting the deck to the second chassis so that the deck and cutting blade are vertically adjustable to vary the cutting height of the cutting blade relative to the supporting surface, the deck connecting means comprising:

a plurality of first stabilizer members, each of the first stabilizer members having a first end and a second end, the first end of each of the first stabilizer members pivotally connected to the deck and the second end of each of the first stabilizer members pivotally connected to the second chassis such that the first stabilizer members are spatially disposed along the deck near the first side thereof;

a plurality of second stabilizer members, each of the second stabilizer members having a first end and a second end, the first end of each of the second stabilizer members pivotally connected to the deck and the second end of each of the second stabilizer members pivotally connected to the second chassis such that the second stabilizer members are spatially disposed along the deck near the second side thereof;

a lever having a first end, a medial portion and a second end, the lever pivotally connected near the first near thereof to the second chassis frame near the forward end thereof so as to be movable between a first position and a second position;

cable means for connecting one of the first and second ends of the lever and the medial portion of the lever to the deck;

a hydraulic assembly for selectively actuating the first chassis wheel means, the cutting blade, the means for movably connecting the second chassis to the front wheel of the first chassis so that the second chassis is movable between the operating position and the inspection position and the lever between the first position and the second position to vertically adjust the disposition of the deck relative to the supporting surface and thereby maintain the cutting blade at a selected height relative to the supporting surface.

16. The riding mower of claim 15 wherein the second chassis is characterized as having a first side, a second side and a cross brace member extending therebetween such that the cross brace member is disposed near the forward end of the second chassis, the lever being pivotally connected to the cross brace member at a position substantially intermediate the first and second sides of the second chassis and the means for selectively moving the lever between the first position and the second position being pivotally connected to the second end of the lever, and wherein the cable means comprises:

a first substantially horizontally disposed pulley journally connected to the first side of the second chassis at the junction of the cross brace member and the first side of the second chassis;

a second substantially horizontally disposed pulley journally connected to the second side of the second chassis at the junction of the cross brace member and the second side of the second chassis;

a first substantially vertically disposed pulley journally connected to the first side of the second chassis at a position between the pivotal connection of the first and second stabilizer members to the first side of the second chassis such that the first substantially vertically disposed pulley is operably aligned with the first substantially horizontally disposed pulley;

a second substantially vertically disposed pulley journally connected to the second side of the second chassis at a position between the pivotal connection of the first and second stabilizer members to the second side of the second chassis such that the second substantially vertically disposed pulley is operably aligned with the second substantially horizontally disposed pulley;

a first cable having a first end and a second end, the first end of the first cable pivotally connected to the first end of the lever and the second end of the first cable pivotally connected to the deck such that the first cable engages the first substantially horizontally disposed pulley and the first substantially vertically disposed pulley; and a second cable having a first end and a second end, the first end of the second cable pivotally connected to the medial portion of the lever so as to be disposed between the pivotal attachment of the lever and the second end of the lever, the second end of the second cable pivotally connected to the deck such that the second cable engages the second substantially horizontally disposed pulley and the second substantially vertically disposed pulley.

17. The riding mower of claim 16 wherein the cable means further comprises:

a first cable guide connected to the deck such that the first cable guide is disposed substantially below the first vertical pulley; and a second cable guide connected to the deck such that the second cable guide is disposed substantially below the second vertical pulley.

18. The riding mower of claim 17 wherein the second chassis has a front end and a rear end, the rear end of the second chassis spatially disposed below and substantially parallel the front end of the first chassis so that the rear end of the second chassis is disposed below the front end of the first chassis, the front end of the second chassis extends a distance forward the front end of the first chassis and the second chassis is disposed substantially parallel to the first chassis when the second chassis is in the operating position, and wherein the lawn implement further comprises means for movably connecting the second chassis to the front end of the first chassis wherein the means for movably connecting the second chassis to the front end of the first chassis comprises:

a first connector assembly for pivotally connecting the second chassis to the first chassis so as to permit horizontal, lateral movement of the second chassis, the deck and the cutting blade relative to the first chassis when the second chassis is in the operating position; and a second connector assembly for pivotally connecting the second chassis to the first chassis so as to permit longitudinal movement of the second chassis, the deck and the cutting blade relative to the first chassis and to permit the second chassis, the deck and the cutting blade to be moved between the operating position and the inspection position, the first and second connector assemblies cooperating with the hydraulic assembly to provide a floating action of the second chassis, the deck and the cutting blade so as to substantially maintain the second chassis, the deck and the cutting blade in a selected position relative to the supporting surface when same are disposed in the operating position and the lawn care implement is moved along the supporting surface.

19. The riding mower of claim 18 wherein the first connector assembly for pivotally connecting the second chassis to the first chassis comprises:

a shaft connected to front end of the first chassis such that the shaft extends from the forward end of the first chassis substantially along a central longitudinal axis of the first chassis;

a support member secured to the second chassis so as to be disposed substantially intermediate the forward and rear ends of the second chassis, the support member extending in an upwardly direction from the second chassis and having a substantially centrally disposed aperture therein adapted to received the shaft extending from the forward end of the first chassis; and means for pivotally connecting the support member on the second chassis to the shaft extending from the forward end of the first chassis.

* * * * *

UNITED STATES PATENT AND TRADEMARK OFFICE
CERTIFICATE OF CORRECTION

PATENT NO. : 5,475,971

DATED : December 19, 1995

INVENTOR(S) : Ronald D. Good et al.

It is certified that error appears in the above-identified patent and that said Letters Patent is hereby corrected as shown below:

Column 1, line 14, after "one", delete ",".
Column 1, line 38, after "housing", delete "fork" and insert --for-- therefor.
Column 1, line 51, after "rotary", delete ",".
Column 4, line 43, after "connectors", delete "10" and insert --110-- therefor.
Column 5, line 18, after "rod", delete "42" and insert --142-- therefor.
Column 5, line 34, after "to", delete "FIGS." and insert --FIG.-- therefor.
Column 5, line 60, delete "152" and substitute --154-- therefor.
Column 7, line 9, after "end", insert --202--.
Column 7, line 10, after "deck", insert --30--.
Column 7, line 12, after the first occurrence of "pulley", insert --188--.
Column 7, line 17, after "blade", insert --34--.
Column 7, line 19, after "guide", insert --204--.
Column 7, line 22, after "deck", insert --30--.
Column 7, line 36, delete "82" and substitute --80-- therefor.
Column 8, line 55, delete "32" and substitute --36-- therefor.
Column 10, line 31, delete "32" and substitute --34-- therefor.
Column 10, line 33, delete "32" and substitute --34-- therefor.
Column 10, line 34, after "30 and", delete "he" and substitute --the-- therefor.

UNITED STATES PATENT AND TRADEMARK OFFICE
CERTIFICATE OF CORRECTION

PATENT NO. : 5,475,971

DATED : December 19, 1995

INVENTOR(S) : Ronald D. Good et al.

It is certified that error appears in the above-identified patent and that said Letters Patent is hereby corrected as shown below:

Column 11, line 6, delete "mean" and substitute --means-- therefor.
    Column 12, line 7, delete "Second" and substitute --second-- therefor.
    Column 12, line 63, delete "received" and substitute --receive-- therefor.
    Column 13, line 39, delete "member" and substitute --members-- therefor.
    Column 13, line 57, delete "o" and substitute --of-- therefor.
    Column 14, line 40, delete "Second" and substitute --second-- therefor.
    Column 19, line 10, after "to", insert --the--.
    Column 20, line 6, delete "received" and substitute --receive-- therefor.

Signed and Sealed this

Eleventh Day of June, 1996

Attest:

BRUCE LEHMAN

*Attesting Officer*     *Commissioner of Patents and Trademarks*